United States Patent
Brock, Sr.

[11] Patent Number: 5,992,264
[45] Date of Patent: Nov. 30, 1999

[54] APPARATUS INCLUDING SHIFTER, PARK BRAKE MECHANISM, AND CONSOLE STRUCTURE

[75] Inventor: Robert D. Brock, Sr., Grand Haven, Mich.

[73] Assignee: Grand Haven Stamped Products, Division of JSJ Corporation, Grand Haven, Mich.

[21] Appl. No.: 09/162,955

[22] Filed: Sep. 29, 1998

[51] Int. Cl.$^6$ .................................................. F16C 1/22
[52] U.S. Cl. ........................................ 74/502.6; 74/501.6
[58] Field of Search ........................... 74/500.5, 501.5 R, 74/501.6, 502, 502.6, 543, 544, 473.3, 473.15; 24/698.1, 698.2

[56] References Cited

U.S. PATENT DOCUMENTS

| | | | |
|---|---|---|---|
| 1,468,522 | 9/1923 | Snell et al. . | |
| 1,927,646 | 9/1933 | Miller . | |
| 3,323,609 | 6/1967 | Rosenberger et al. . | |
| 3,936,914 | 2/1976 | Mancini | 24/698.2 |
| 4,515,036 | 5/1985 | Dotson | 74/535 |
| 4,545,467 | 10/1985 | Fernandez et al. | 192/4 A |
| 4,606,238 | 8/1986 | Ikemoto et al. | 74/473 R |
| 4,693,135 | 9/1987 | LaRocca et al. | 74/473 R |
| 4,711,135 | 12/1987 | Horiuchi et al. | 74/473 R |
| 5,080,434 | 1/1992 | Locher | 74/502 |
| 5,462,146 | 10/1995 | Doolittle et al. | 192/4 A |
| 5,660,081 | 8/1997 | Sato | 74/502 |
| 5,887,485 | 3/1999 | VanOrder et al. | 74/473.15 |

*Primary Examiner*—Tamara L. Graysay
*Assistant Examiner*—Chong H. Kim
*Attorney, Agent, or Firm*—Price Heneveld Cooper Dewitt & Litton

[57] ABSTRACT

An apparatus includes a base, a park brake mechanism and a shift lever both operably attached to the base, and a console configured to cover the components. The components are designed to minimize parts and pieces, including minimizing time required for subassembly together as a unit and minimizing time required for assembly into vehicles. The park brake mechanism includes a quick-attachment structure for drop-in attachment to a spanning bracket for operably engaging wheel park brake cables in the vehicle to the park brake mechanism. The arrangement provides a balanced pulling force, despite unequal lengths of the park brake cables. Further, the shifter includes a shift lever adapted to shift a manual transmission, but constructed to minimize transmission of vibration from the vehicle to the shift lever during operation of the vehicle. Still further, the base includes apertured flanges configured to receive hook-shaped quick-attach connectors on the side walls of the console for securing the console to the base.

7 Claims, 19 Drawing Sheets

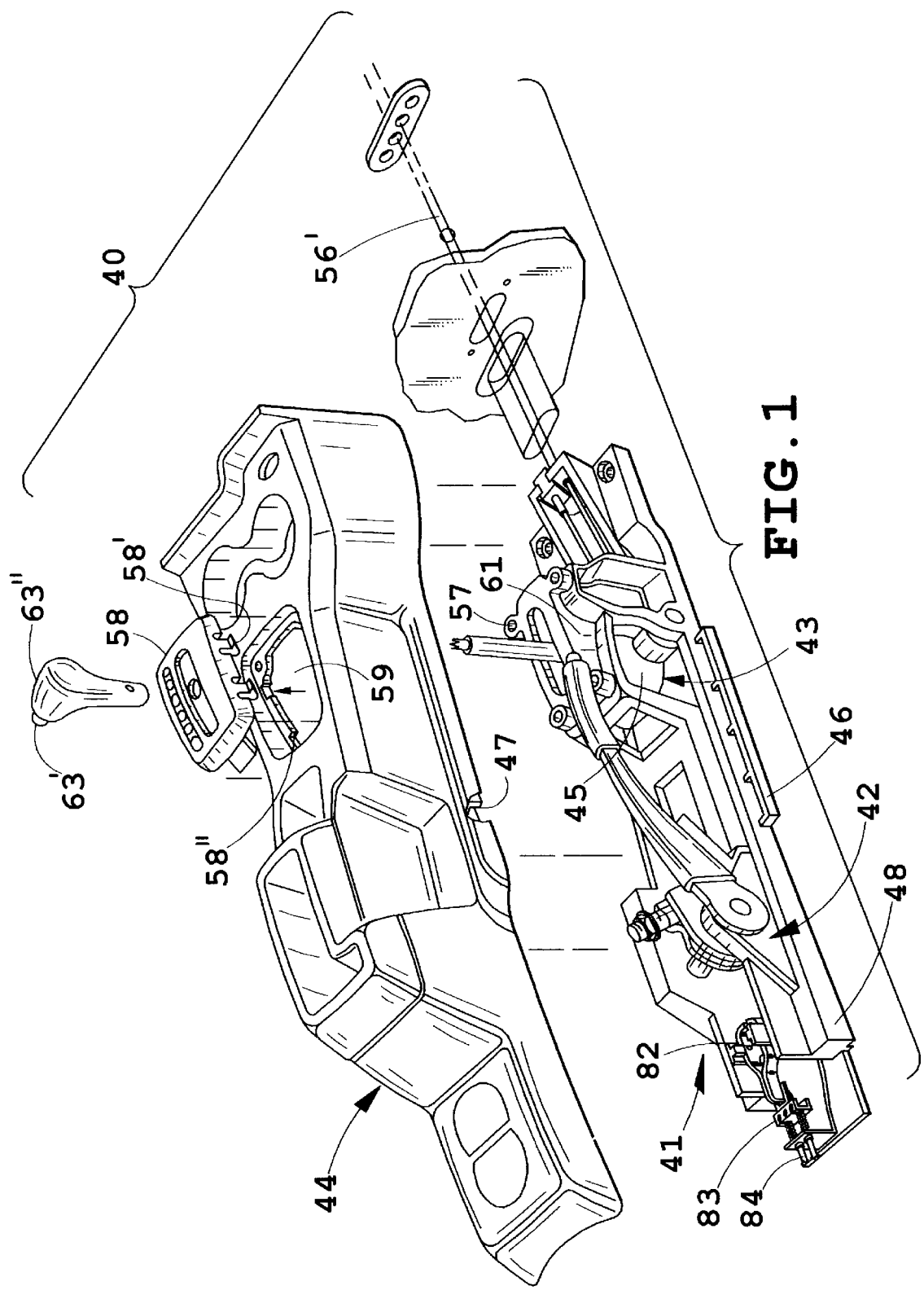

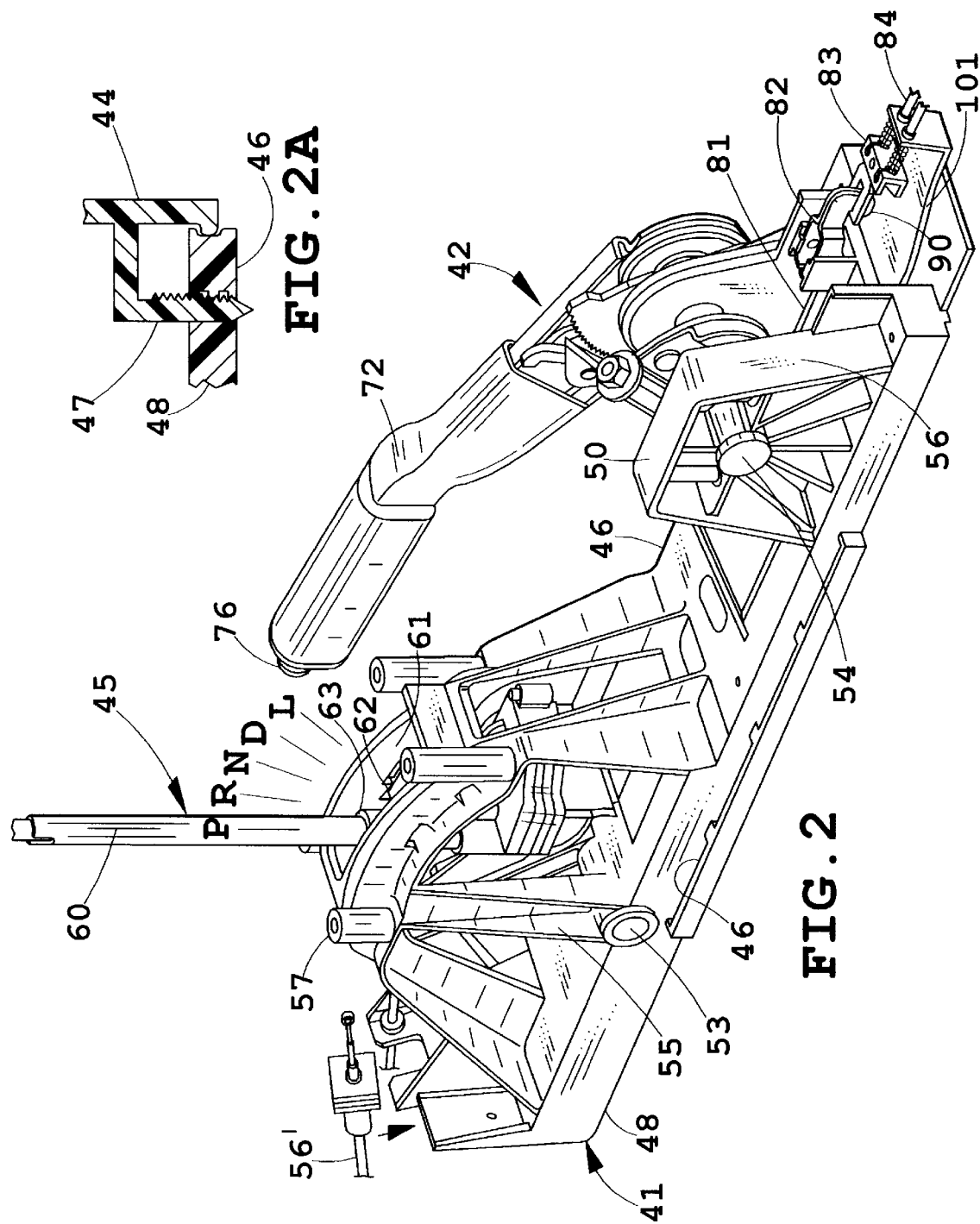

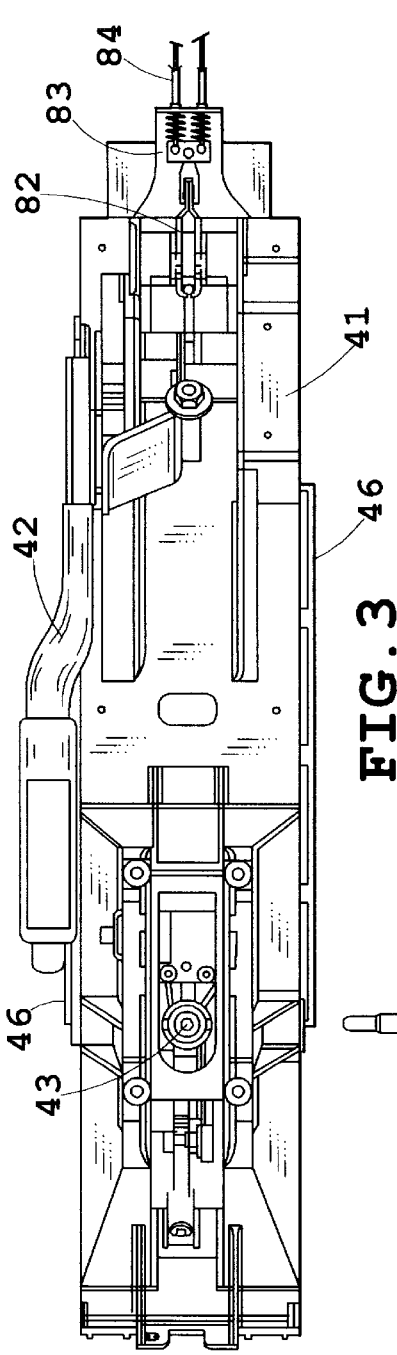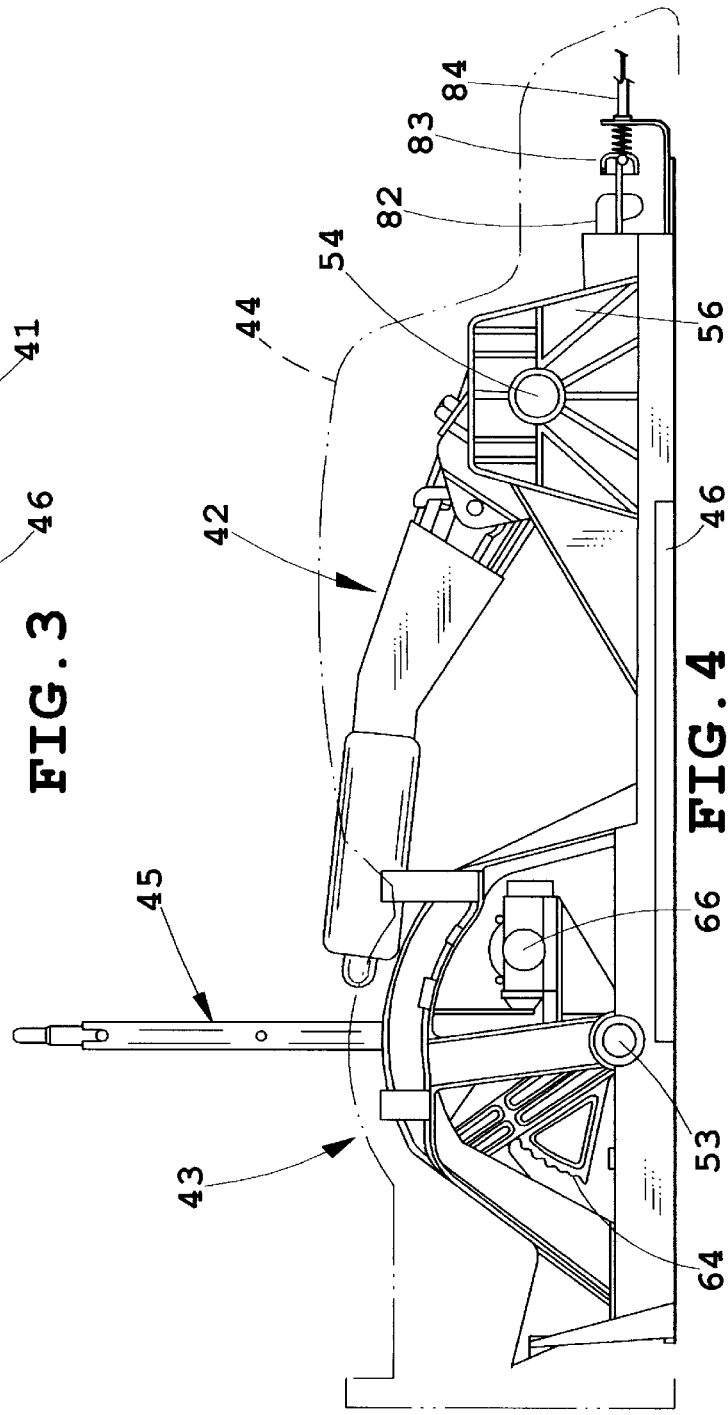

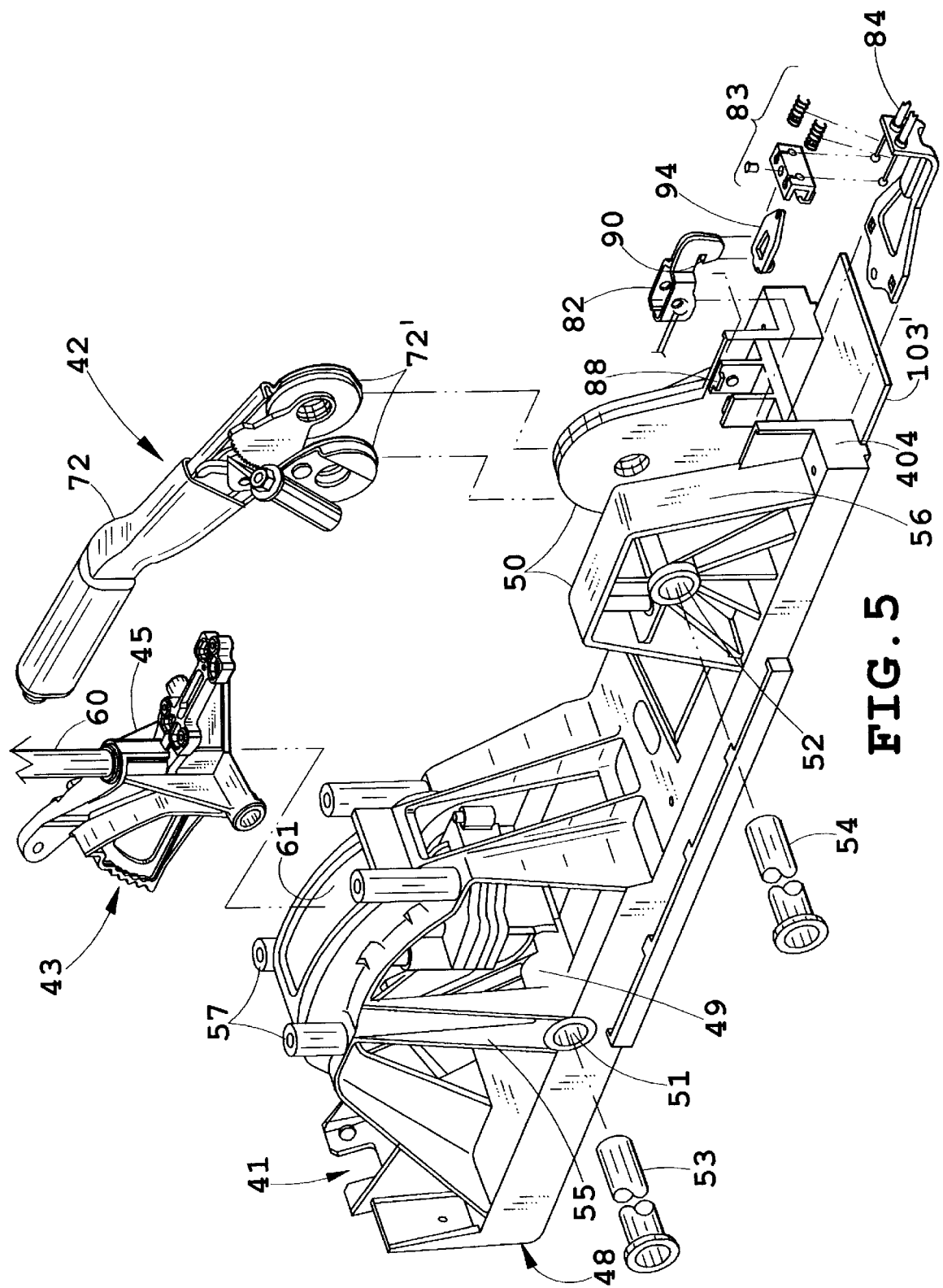

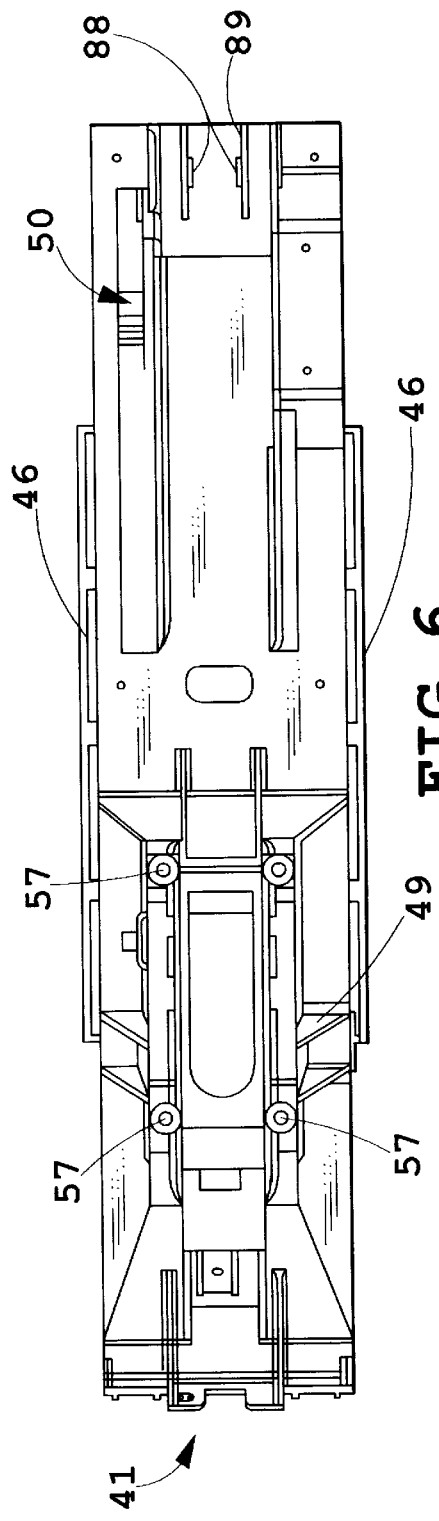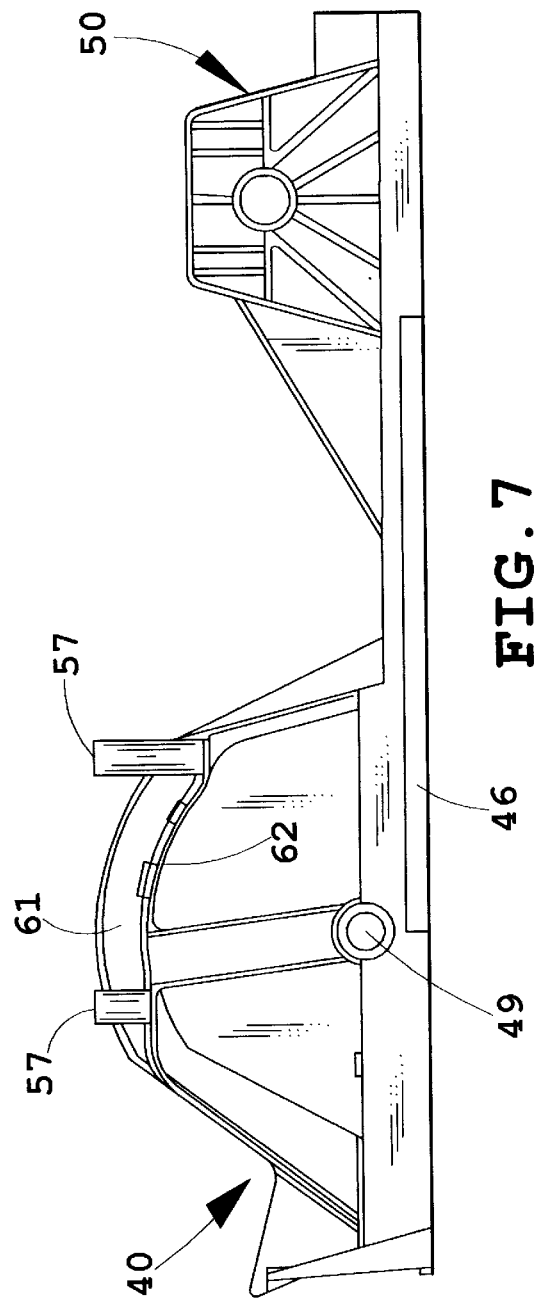

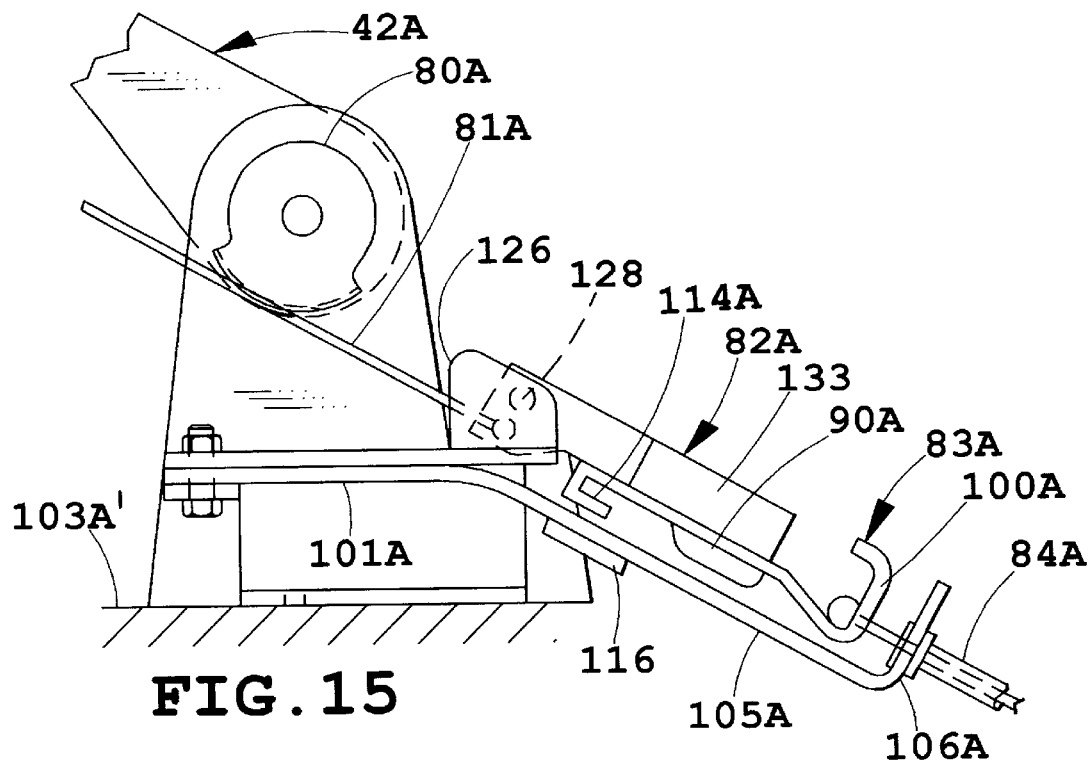
FIG.15
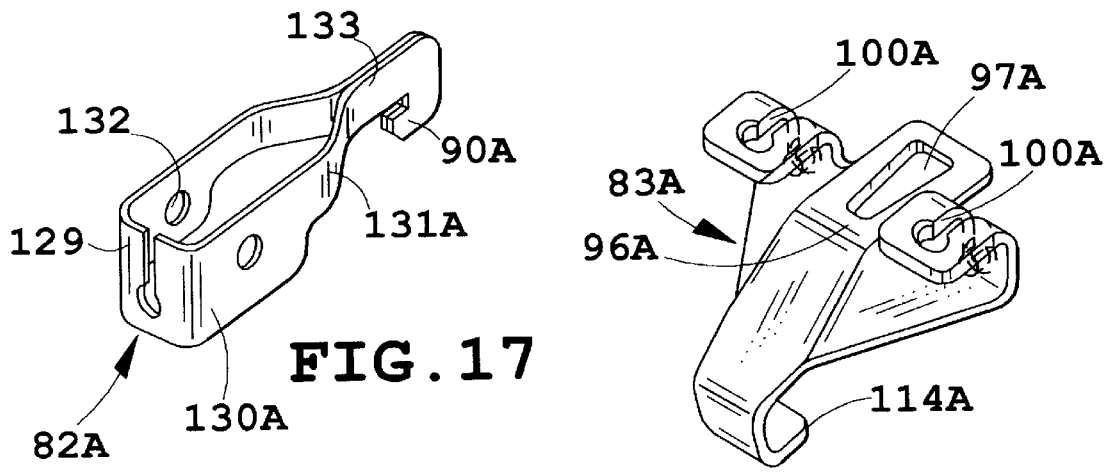
FIG.17
FIG.18
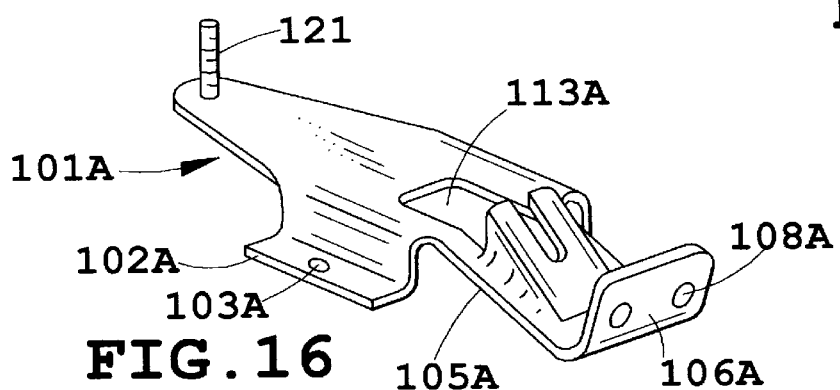
FIG.16

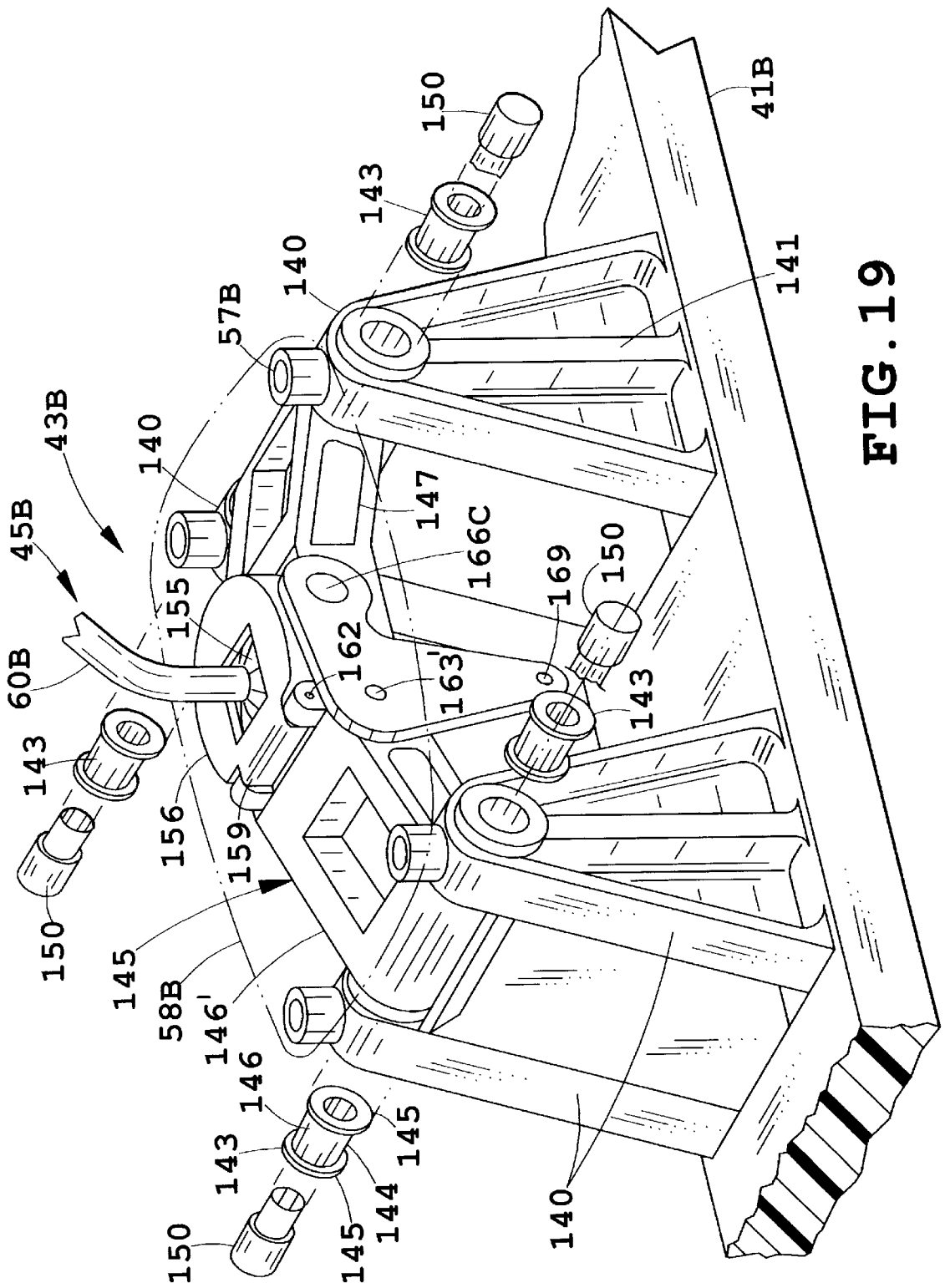

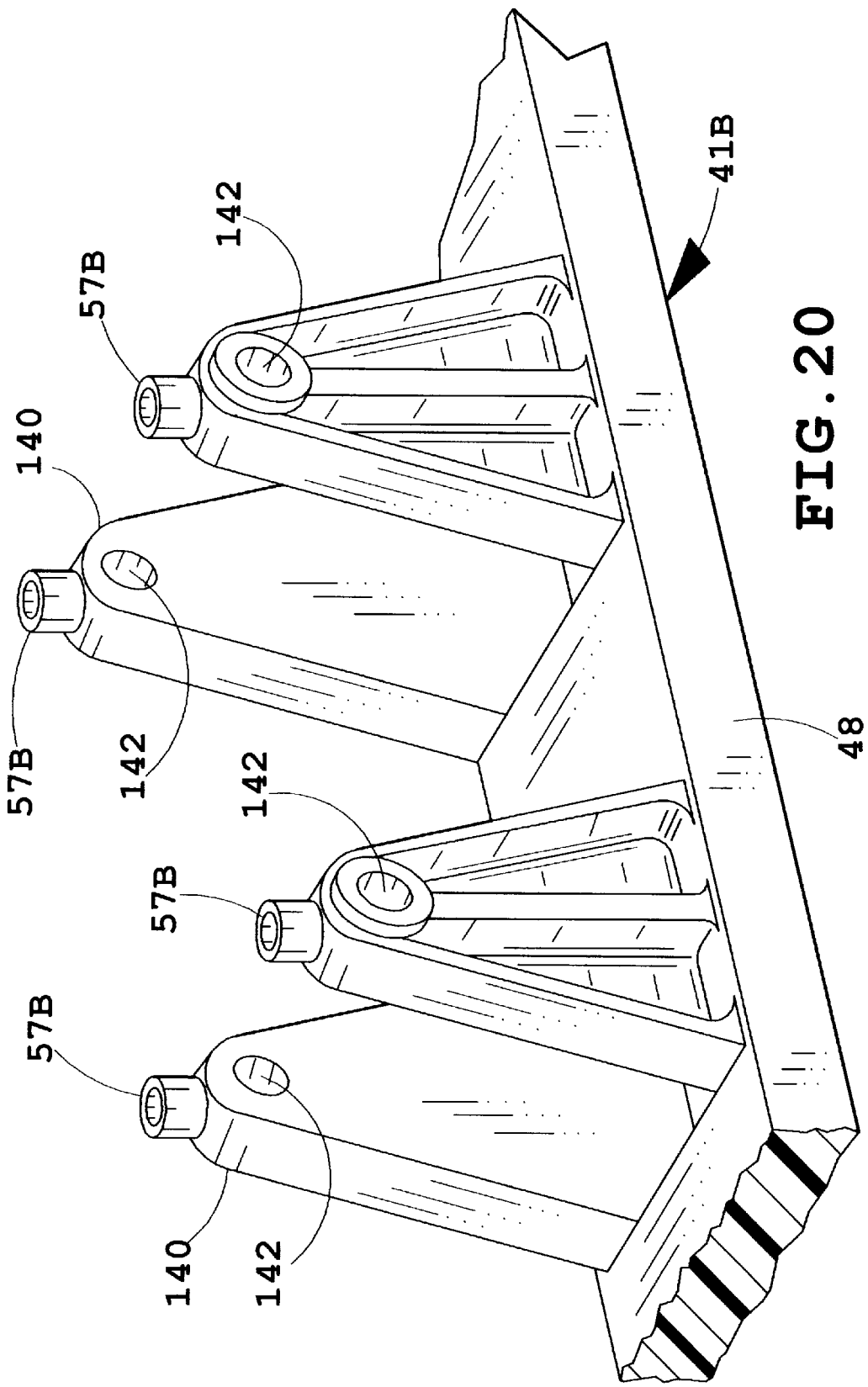

APPARATUS INCLUDING SHIFTER, PARK BRAKE MECHANISM, AND CONSOLE STRUCTURE

BACKGROUND OF THE INVENTION

The present invention concerns an improved apparatus including a shifter, a park brake mechanism, and a console structure that mate together in a novel manner to facilitate assembly to each other and installation into a vehicle.

Many modern vehicles have a console positioned between their front seats, and further have a shifter and a park brake mechanism located in the console. It is desirable to design these components to minimize cost and time required for assembly to each other and into the vehicle, including features that minimize assembly labor and assembly time, minimize the use of separate fasteners, and yet that are secure so as to maintain a low warranty and a high consumer satisfaction.

In particular, installation of a park brake mechanism can be time consuming because the park brake mechanism must be fixedly secured to the vehicle, and also park brake cables must be attached and tightened for operation. But the park brake cables are not always in a convenient place to be grasped by the installer, thus requiring the installer to search for and manipulate the park brake cables, which slows the assembly process. Also, many separate fasteners must be used, such as screws and clips, requiring assembly time to orient and install. Installation of the shifter can present similar problems, in terms of securement to the vehicle and attachment of transmission shift cables. Installation of the console also presents similar problems, since the console must be secured to the vehicle in multiple places on both sides at its front and rear, and also any electrical accessories (such as cigarette lighters, lights, or phones) and/or other utilities (such as air duct connections for providing air to back seats) must be operably connected.

Manual transmission shifters also have a problem in that vibrations from the vehicle and/or the transmission can cause an unacceptable amount of vibration in a handle of the shifter. For this reason, the shifters must be constructed to minimize transmission of vibration through a base of the shifter to the shifter handle. At the same time, the number of parts, the time required for assembly, cost, and sureness of assembly must be optimized.

Accordingly, an apparatus is desired solving the aforementioned problems and having the aforementioned advantages.

SUMMARY OF THE INVENTION

In one aspect of the present invention, an apparatus includes a base configured for attachment to a vehicle and having a rear end with a mounting structure thereon, and a park brake mechanism operably mounted to the base. The apparatus further includes a cable connector sled operably mounted on the mounting structure and connected to the park brake mechanism. The cable connector sled includes flanges slidably engaging the mounting structure, and further includes a hook. A spanner bracket includes an apertured flange and a trailing flange. The trailing flange is adapted to operably securely engage ends of a pair of park brake cables at spaced-apart locations and constructed to receive and engage the hook for quick drop-in assembly. The spanner bracket is operably attached to the cable connector sled, and one of the spanner bracket and the cable connector sled are configured to pivotally adjust to uneven lengths of the pair of park brake cables, so that the spanner bracket provides an equal force to each of the park brake cables when pulled by the park brake mechanism, even when the park brake cables have unequal lengths.

In another aspect of the present invention, an apparatus includes a base including at least two mounting stanchions spaced apart a predetermined distance, the mounting stanchions having first apertures therein. A shifter includes a support and a shift lever pivoted to the support, where the support has pivot sections defining a width less than the predetermined distance and including second apertures. Bushings are provided that are made of a resilient material having a dampening property for reducing transmission of noise. The bushings each include a sleeve section positioned in one of the first and second apertures, and further include at least one washer-simulating end section positioned on an end of the sleeve section and located between the support and the mounting stanchion. Pins are extended through the first apertures and the mounting bushings and into the second apertures. The mounting bushings are configured to prevent direct contact between the base and the shifter, so that the at least one mounting bushing dampens vibration transmitted from the base into the shifter.

In yet another aspect, an apparatus includes a one-piece molded base including: first, second, and third mounts; a shift lever pivotally mounted to the first mount; a park brake mechanism operably mounted to the second mount; and a console configured for snap attachment to the third mount.

These and other aspects, objects, and advantages of the present invention will be further understood by a person of ordinary skill in the art upon studying the present specification, claims, and appended drawings.

BRIEF DESCRIPTION OF THE DRAWINGS

FIG. 1 is an exploded front perspective view of the present apparatus embodying the present invention, including a base subassembly having a park brake mechanism and a shifter operably mounted on the base subassembly, and a console exploded away from the base;

FIG. 2 is a rear perspective view of the base subassembly shown in FIG. 1;

FIG. 2A is a side cross-sectional view of the console-to-base attachment structure shown in FIG. 1;

FIGS. 3 and 4 are top and side views of the base subassembly shown in FIG. 2;

FIG. 5 is an exploded perspective view of the base subassembly shown in FIG. 2;

FIGS. 6 and 7 are top and side views of the base subassembly shown in FIG. 5;

FIG. 15 is a side view of the park brake cable connection system shown in FIG. 14;

FIG. 16 is a perspective view of the modified support bracket shown in FIG. 14;

FIG. 17 is a perspective view of the spanner bracket shown in FIG. 14;

FIG. 18 is a perspective view of the cable connector sled shown in FIG. 14;

FIG. 19 is a perspective view showing a modified base having stanchions and a shift lever support configured to pivotally support a manual shift lever for shifting a manual transmission;

FIG. 20 is a fragmentary perspective view of the modified base shown in FIG. 19;

DETAILED DESCRIPTION OF PREFERRED EMBODIMENTS

Figure 8:
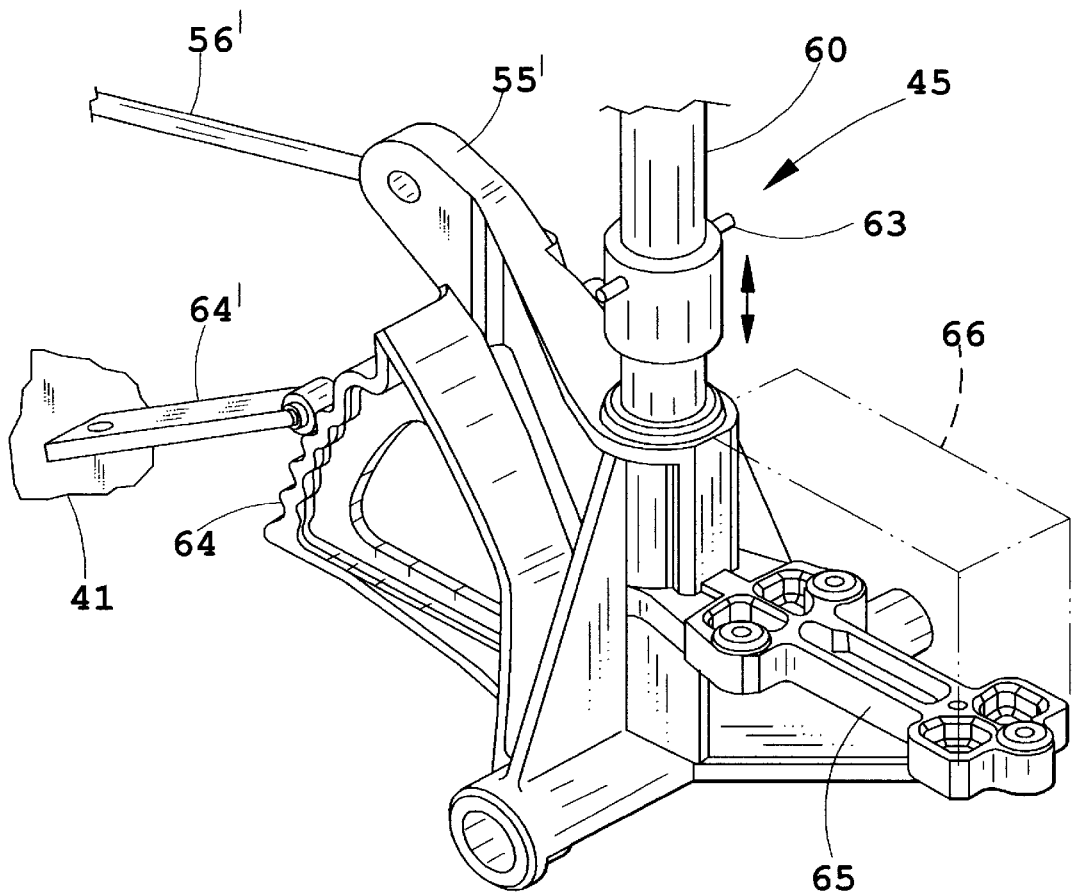
FIG. 8 is a perspective view of the shift lever shown in FIG. 5.

An apparatus 40 (FIG. 1) embodying the present invention includes a base 41, a park brake mechanism 42 and a shifter 43 both operably attached to the base 41, and a console 44 attachable to the base 41 and configured to cover the components 41–43. The components 41–44 are designed to minimize the time required for subassembly together as a unit and to minimize the time required for assembly into vehicles. In particular, the park brake mechanism 42 includes a quick-attachment structure for quick drop-in attachment to a spanning bracket 83, where the spanning bracket 83 is previously installed in a vehicle and is operably engaged with park brake cables 84. The spanning bracket 83 is configured to engage the park brake mechanism 42 in a manner that provides a balanced pulling force despite unequal lengths of the park brake cables 84. Still further, the base 41 includes apertured flanges 46 configured to receive quick-attach connectors 47 on the side walls of the console 44 for securing the console 44 to the base 41, so that the console 44 can be quickly and easily attached to the base 41 from above during assembly (or during repair).

Base 41 (FIG. 5) includes a molded unitary body 48 configured to mateably engage and be secured to a vehicle floor pan. Front pivot mounts 49 are configured to pivotally support a shift lever 45, and a pair of upwardly extending rear pivot mounts 50 are configured to operably support the park brake mechanism 42. The front and rear pivot mounts 49 and 50 include apertures 51 and 52 for receiving pivot pins 53 and 54, and further include side walls 55 and 56 and stiffening ribs for supporting the pivot pins 53 and 54 with the park brake mechanism 42 and shifter 43 operably supported thereon. The illustrated shifter 43 has an arm 55' (FIG. 8) having a universal cable connector thereon adapted for connection to a Bowden cable 56' for shifting an automatic transmission. The base 41 (FIG. 1) includes a cover-supporting structure with apertured bosses 57 for receiving screws to attach console 44, and console 44 includes blind surfaces 58" for receiving snap-attach fasteners 58' on cover 58 for securing the cover 58 (FIG. 1). The cover 58 is shaped to close an opening 59 in the console 44 that receives a post 60 on the shift lever 45. An arch 61 (FIG. 2) extends fore-to-aft on the base 41, and includes notches 62 defining gear positions such as park "P," reverse "R," neutral "N," drive "D," and low drive "L" for operably receiving a pawl 63 to control movement of the shift lever 45. The pawl 63 on the shift lever 45 is operated by movement of a pawl button 63' (FIG. 1) on the handle 63", and is configured to operably engage the notches 62 to control movement of the shift lever 45 between gear positions. A feel positioner for the shift lever 45 includes an undulated surface 64 (FIG. 8) on the shift lever 45 having depressions corresponding to the gear positions PRNDL, and a spring biased roller 64' on the base 41 engages the depressions. The shift lever 45 includes a mount 65 for attaching a brake-ignition-transmission-shift-interlock (BITSI) device 66. The BITSI device is positioned to control movement of the shift lever 45 between gear positions PRNDL by preventing movement of the pawl 63 out of park gear position P until certain vehicle conditions are met. Many different devices are known in the art for controlling movement of a pawl out of a park position, and they are often provided on modern shifters, such that further description herein is not necessary to understand the present invention.

Figure 10:
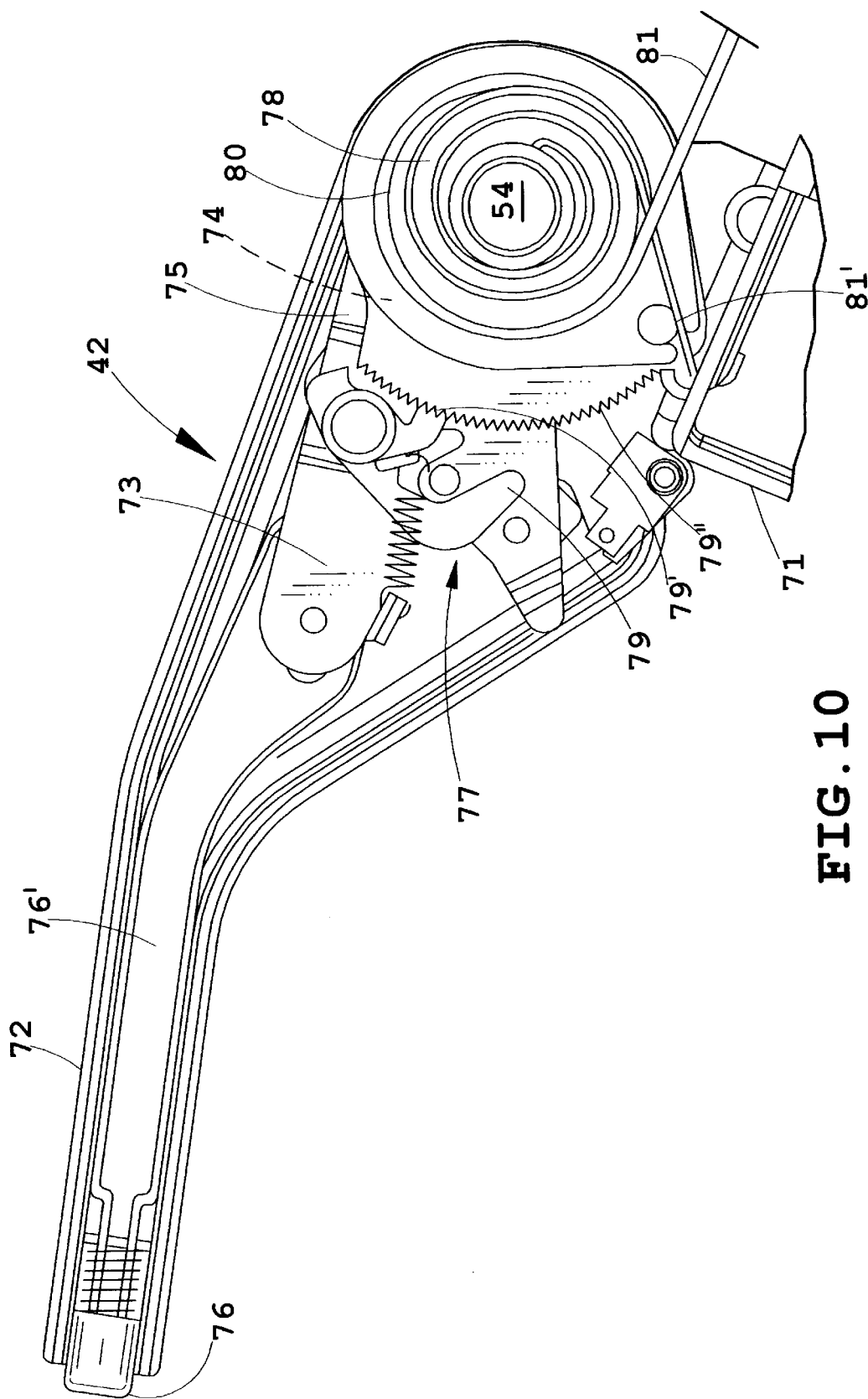
FIG. 10 is a side view of the park brake mechanism shown in FIG. 5, the mechanism including an optional self-adjust tensioning feature.
Figure 11:
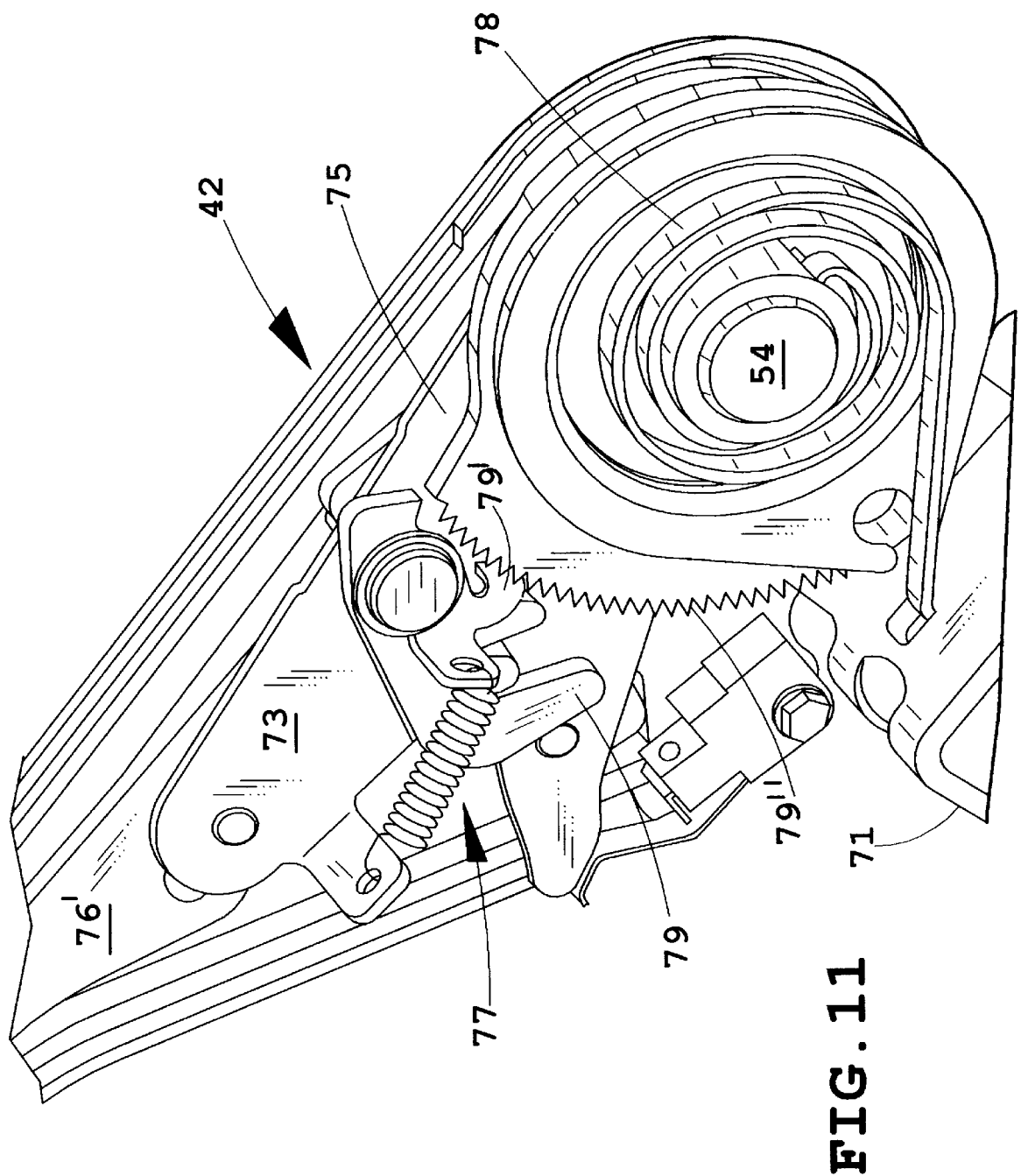
FIG. 11 is an enlarged fragmentary perspective view of the park brake mechanism shown in FIG. 10.
Figure 12:
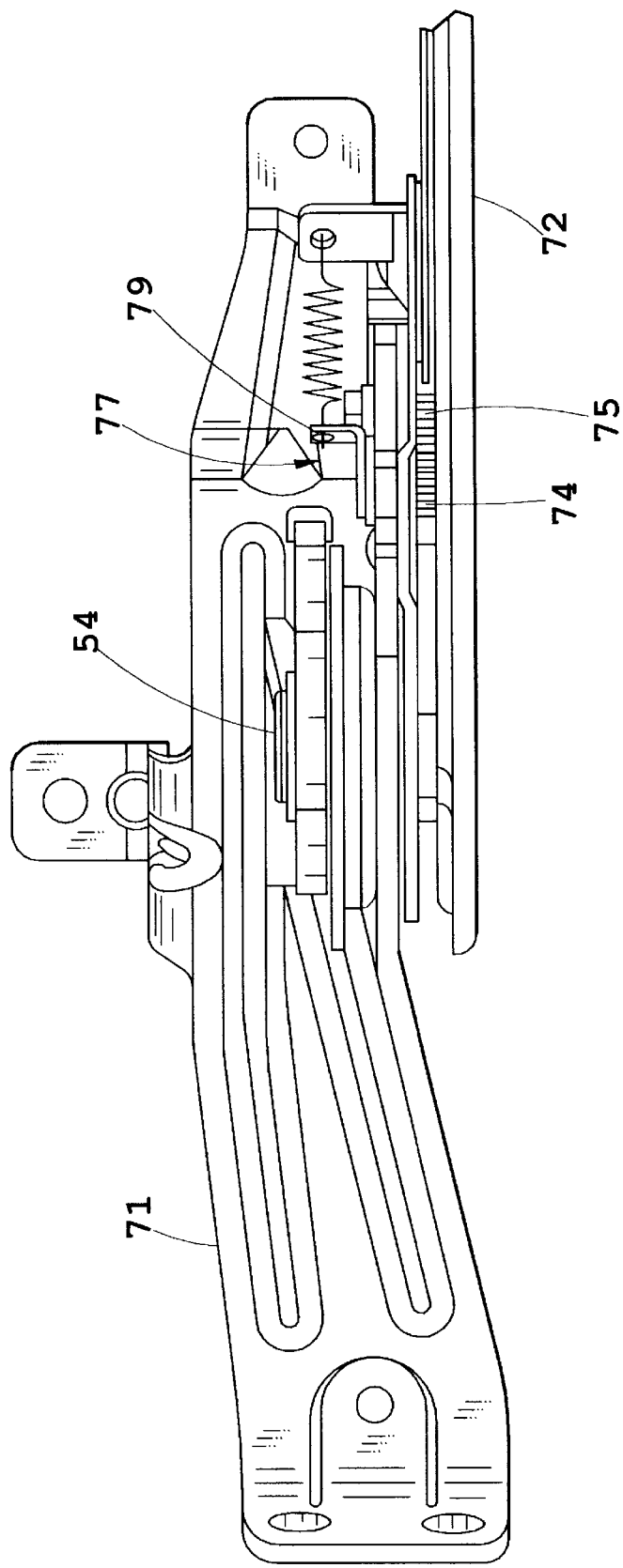
FIG. 12 is a top view of the park brake mechanism shown in FIG. 10.
Figure 13:
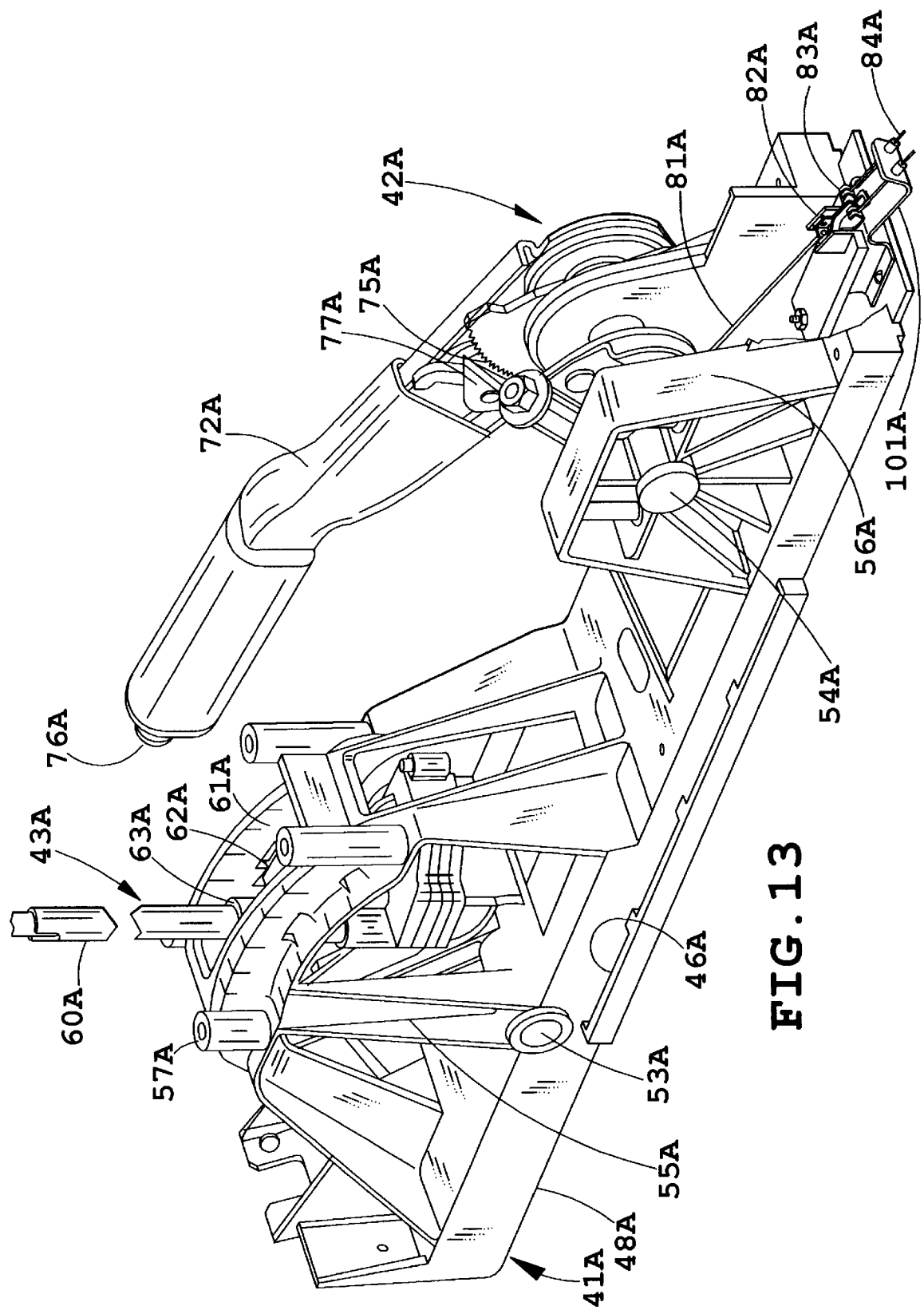
FIG. 13 is a perspective view of a modified base subassembly including a modified angled park brake attachment mechanism.
Figure 14:
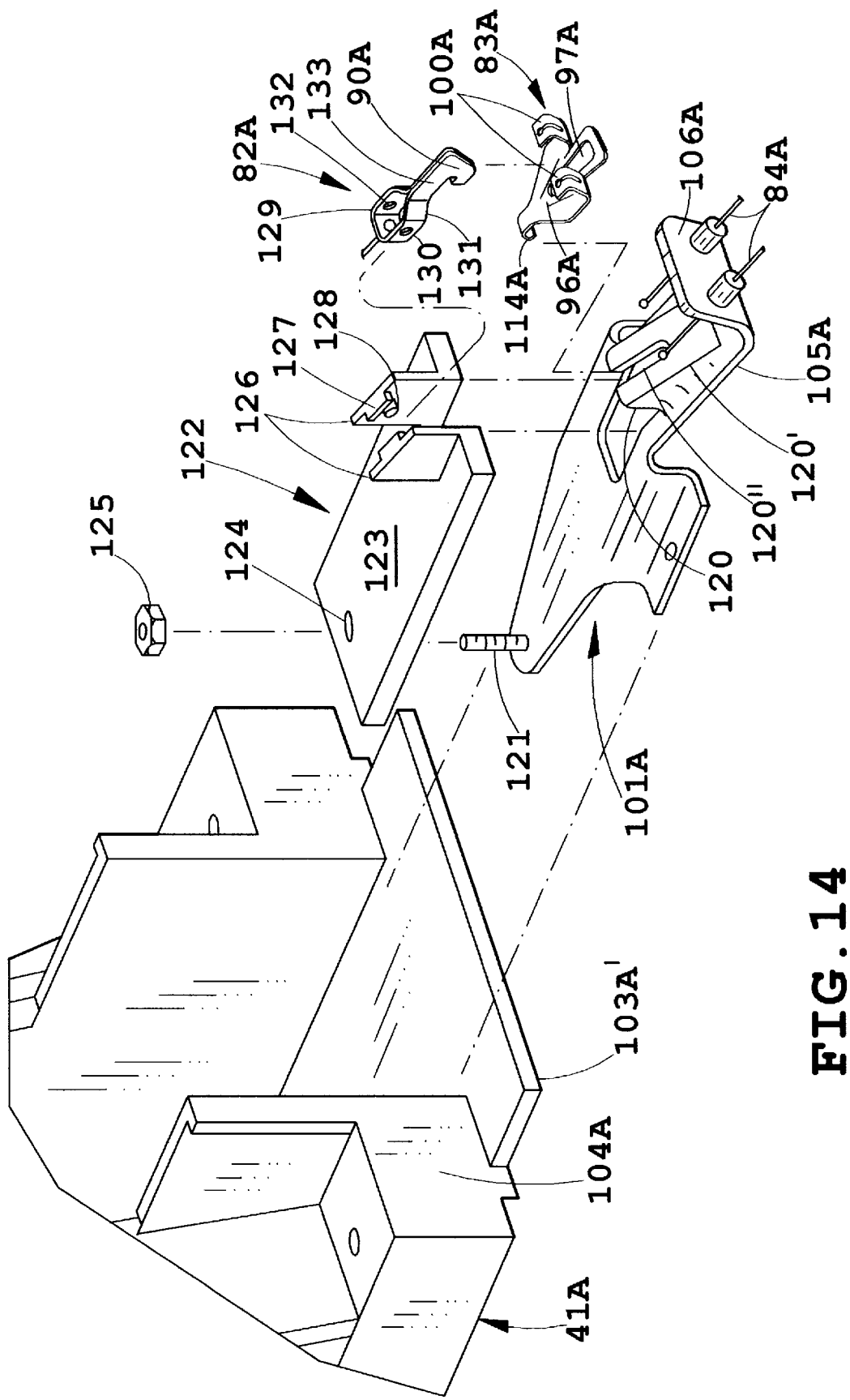
FIG. 14 is an enlarged exploded perspective view of the park brake attachment mechanism shown in FIG. 13.
Figure 21:
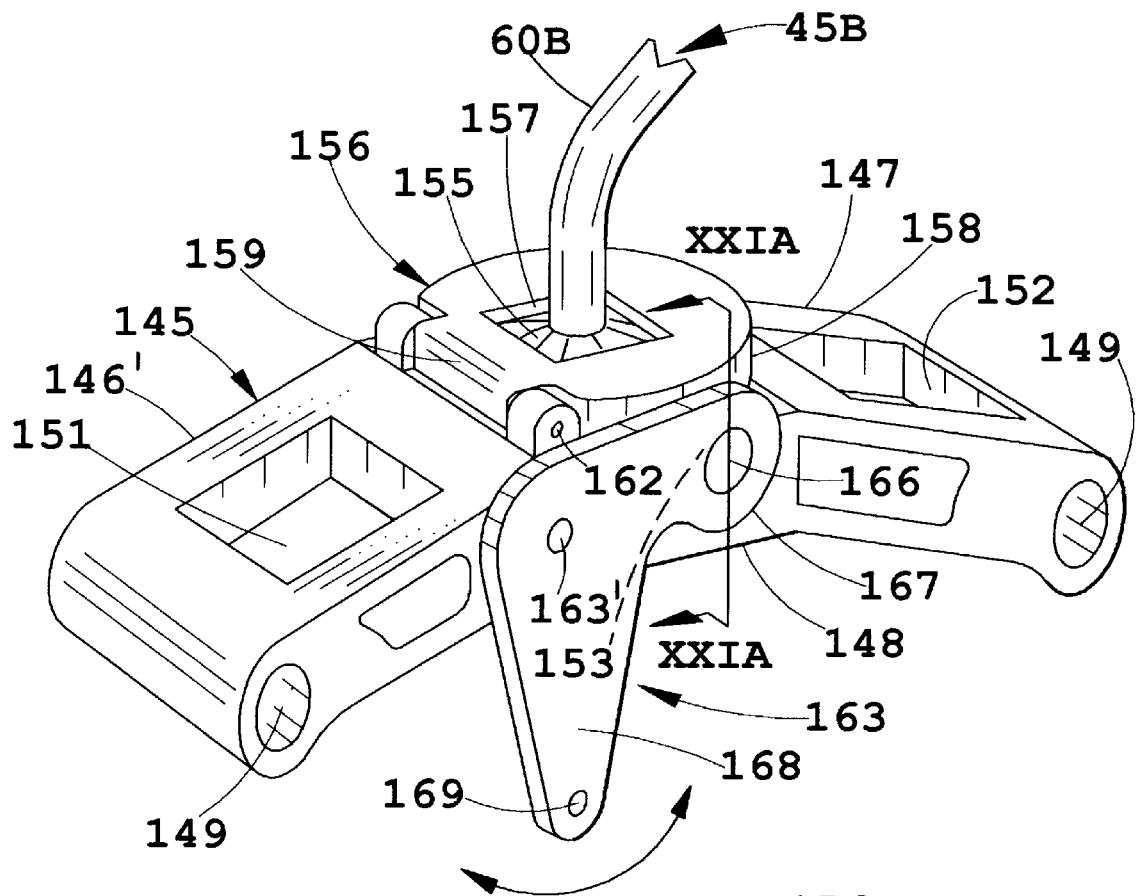
FIG. 21 is a perspective view of the shift lever support shown in FIG. 19.
Figure 21A:
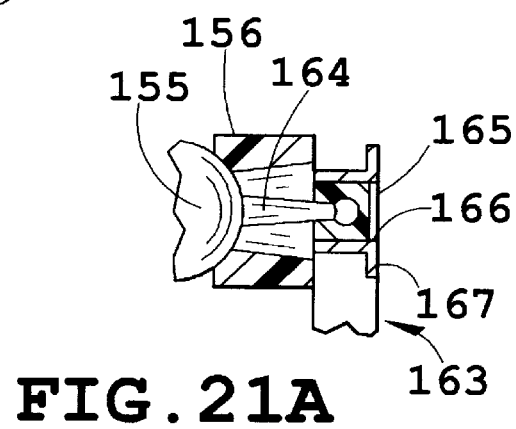
FIG. 21A is a cross-sectional view taken along line XXIA in FIG. 21.
Figure 22:
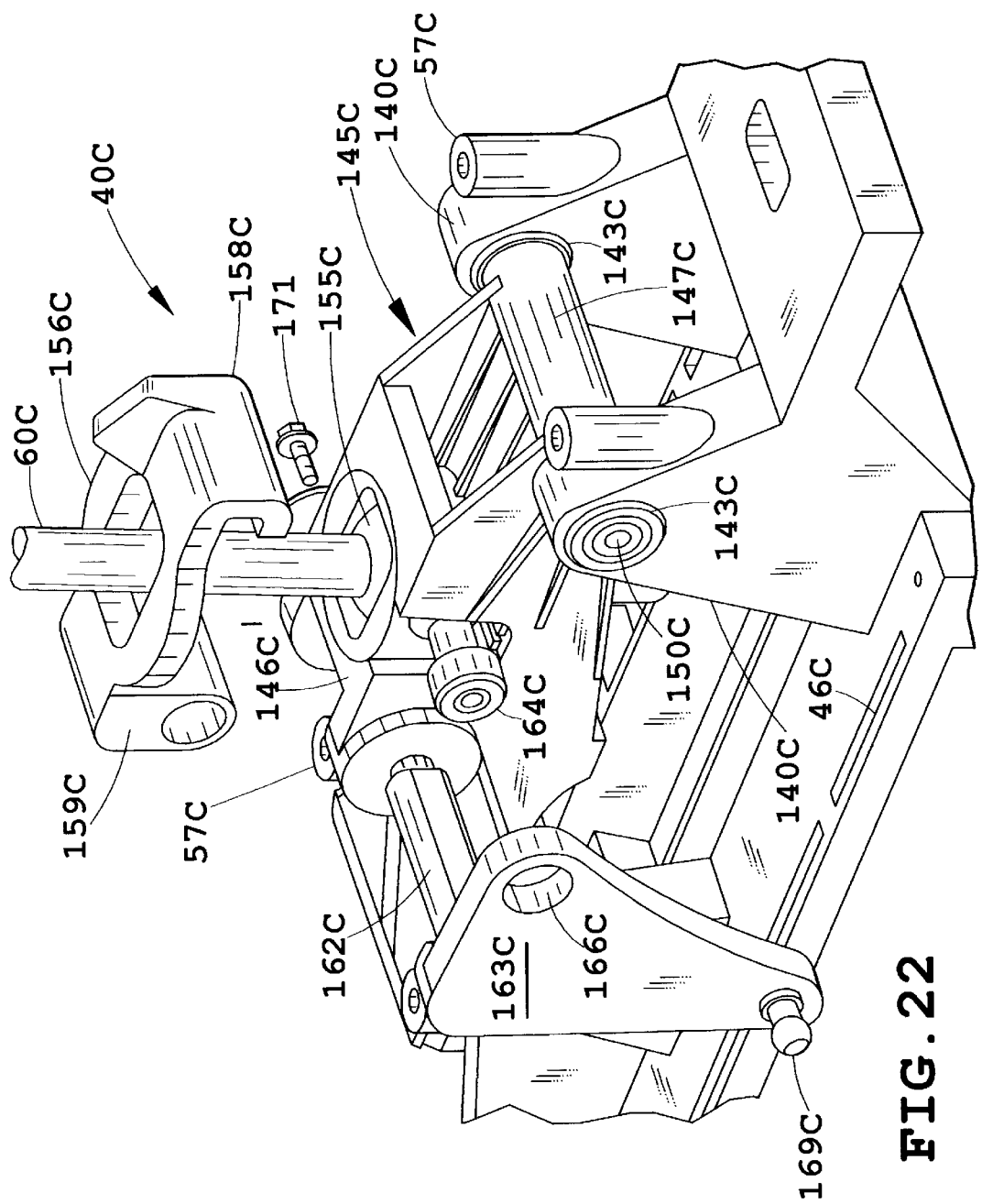
FIG. 22 is an exploded perspective view of a modified shifter and modified base for supporting same.
Figure 23:
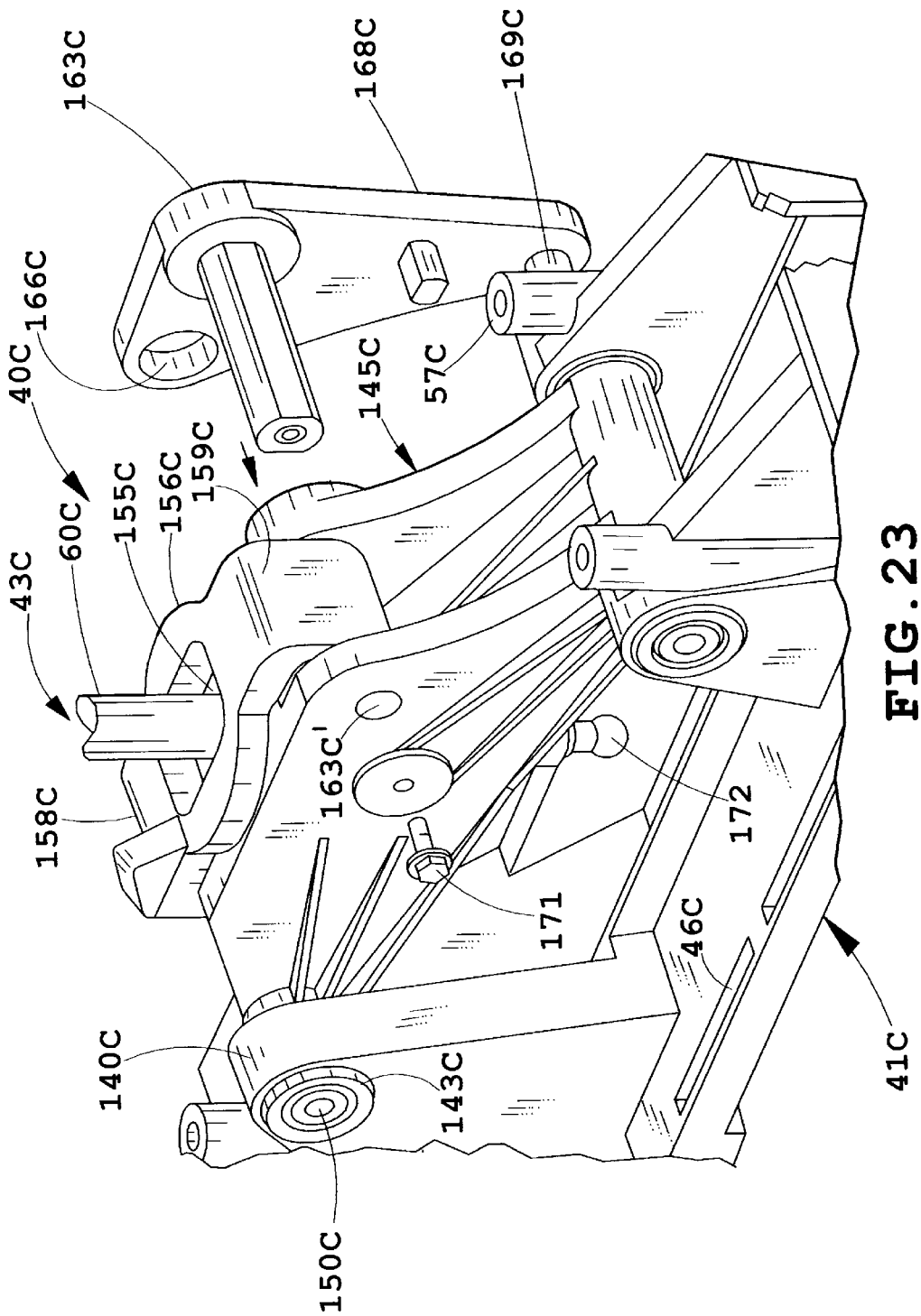
FIG. 23 is a partially exploded perspective view of the shift lever support shown in FIG. 20.
Figure 24:
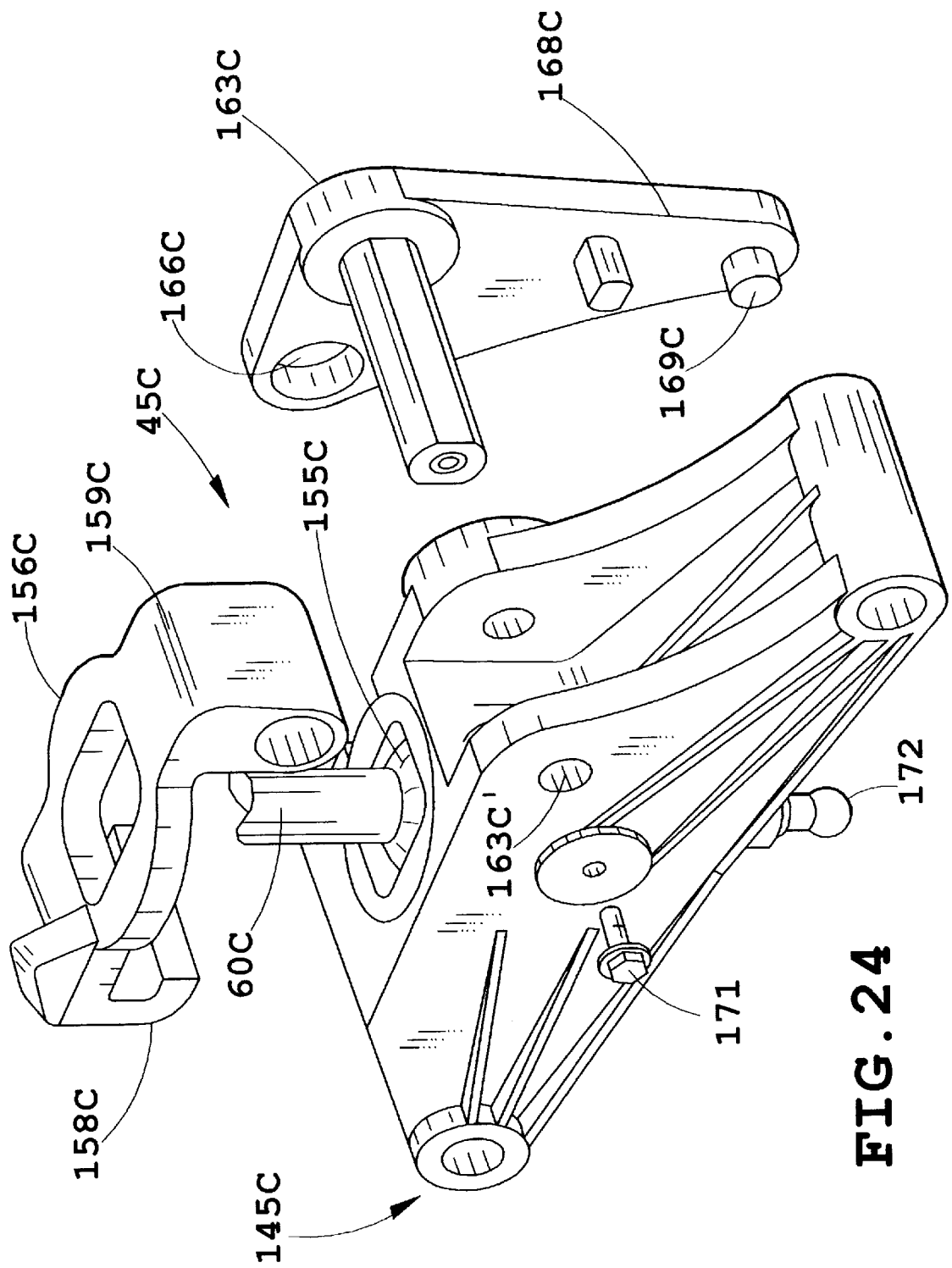
FIG. 24 is a partially exploded perspective view of the shift lever support shown in FIG. 23.

Park brake mechanisms are generally known in the art, such that a detailed description is not necessary for an understanding of the present invention. Nonetheless, the following description is provided to give the reader a good understanding of same. The present park brake mechanism 42 (FIG. 10) is mounted on rear pivot mounts 50 to base 41, and may include a park brake frame 71 for adding stability to the park brake mechanism 42 and to the rear pivot mounts 50. A park brake handle 72 includes spaced-apart flanges 72' (FIG. 5) and is pivoted to rear pivot mounts 50 by the pivot pin 54. A ratcheting catch 73 (FIG. 10) includes a fixed section of teeth 74 and a ratching pawl 75 that releasably engages the teeth 74 to hold a tension on the park brake cables when an operator pulls on handle 72. A thumb release button 76 on the handle 72 is operably attached to the ratcheting pawl 75 by linkage 76' to release the catch 73 when the operator desires to remove the tension of the park brake cables 84 for preparing the vehicle to roll freely in an unbraked condition.

Optionally, a minimum cable tensioning mechanism 77 is provided that includes a spiral spring 78 and spring tension automatic adjuster 79 with teeth 79' configured to self adjust on hub teeth 79" with a ratcheting action as the park brake mechanism 42 is used. The spiral spring 78 keeps a continuous minimum tension on the park brake cables 84. The spring tension automatic adjuster 79 is constructed to do several tasks. The adjuster 79 automatically operates when the handle 72 is first pulled and then released, to set an initial minimum tension on the park cables. When the handle 72 is pulled thereafter, the adjuster 79 locks so that the park brake mechanism 42 directs the full force of the operator's effort into locking the park brakes of the vehicle. However, when the handle 72 is released, the automatic feature on the adjuster 79 again readjusts and applies the minimum tension to the park brake cables. As components wear or the park brake cables stretch, the adjuster 79 adjusts to continuously apply the minimum cable tension to the park cables.

The park brake handle 72 is connected to a reel 80 (FIG. 10, and also see FIG. 15) having a short cable 81 anchored at its inner end 81' on reel 80 and stretched around the reel 80. The short cable 81 extends tangentially from reel 80 and is connected through a cable connector sled 82 (FIG. 5) and a spanning bracket 83 to the wheel park brake cables 84, as described below.

Figure 9:
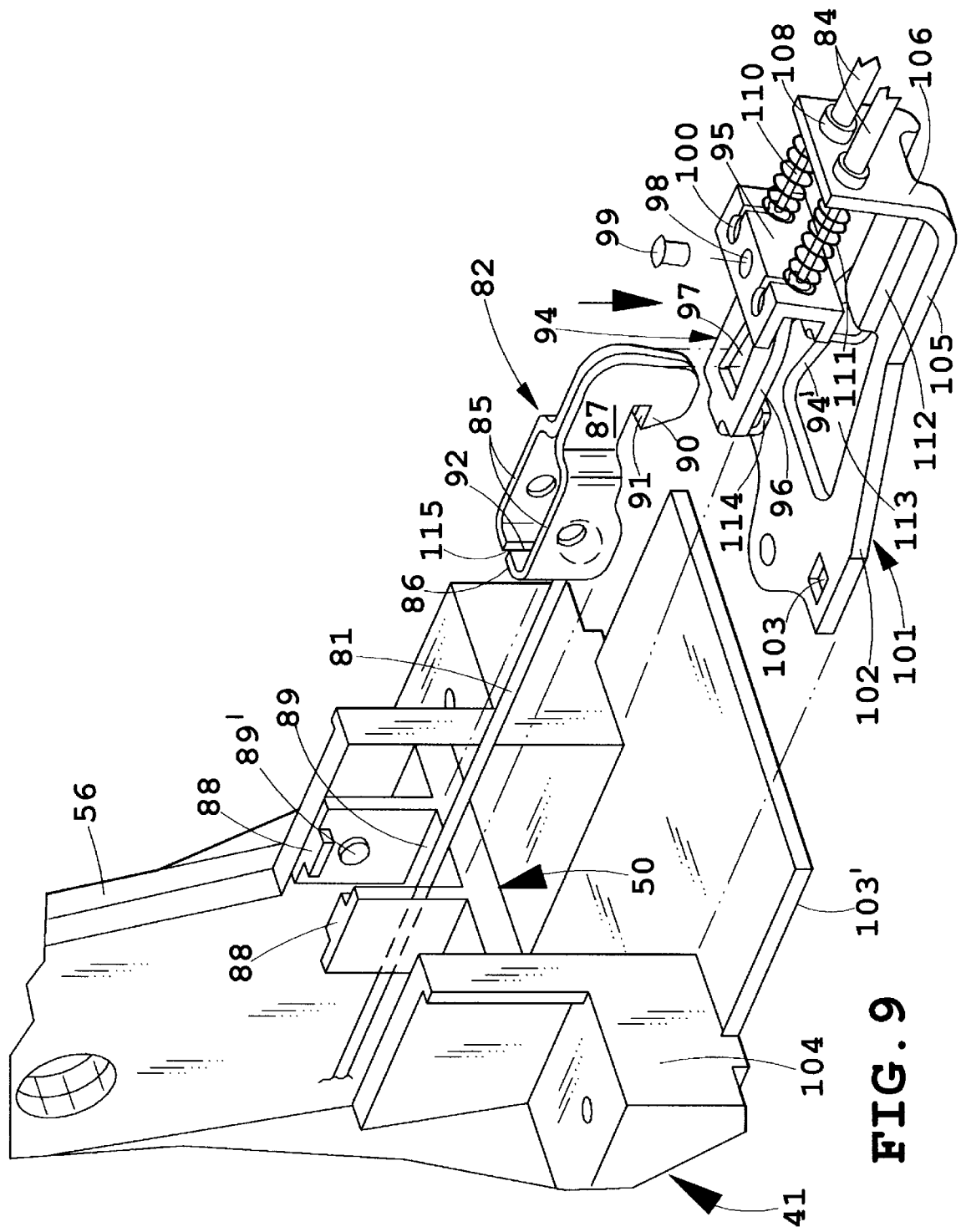
FIG. 9 is an enlarged exploded perspective view of the park brake attachment mechanism shown in FIG. 5.

The cable connector sled 82 (FIG. 9) includes a body with side flanges 85, tail flange 86, and a centered down flange 87. Edges of the side flanges 85 slidably engage a track formed by spaced-apart top guide tabs 88 and bottom surface 89 on rear mount 50. The down flange 87 has a forwardly facing hook 90 with a long/thin notch 91 therein. A keyhole 115 in tail flange 86 mateably engages the enlarged end of the short cable 81. Side flanges 85 include apertures or depressions for temporarily frictionally engaging detents 89' in the side mount 50. The detents 89' hold the sled 82 during shipping, but release the sled after assembly to a vehicle.

The spanning bracket 83 (FIG. 9) includes a hook-engaging front piece 94 and a cable-engaging rear piece 95. The front piece 94 includes a flat section 96 having an aperture 97 for closely receiving the hook 90. The hook 90 and aperture 97 are configured so that, once hook 90 engages the flat section 96, the cable connector sled 82 and the front piece 94 become a rigid unit that moves as one. Nonetheless, the aperture 97 permits some horizontal swinging or "tail-wagging" movement of hook 90 therein. The rear piece 95 is C-shaped and is positioned to overlap onto a rear edge 94' of front piece 94. A rear end of the front piece 94 includes a hole, and the rear piece 95 includes an aligned hole 98 through which a pivot rivet 99 extends for pivotally connecting pieces 94 and 95. A pair of keyholes 100 are formed in the rear piece 95 for matingly engaging an enlarged end of the wheel park brake cables 84. The rivet 99 allows the rear piece 95 to rotate about a vertical axis when the park brake mechanism 42 is tensioned, thus allowing the rear piece 95 to self-align for providing a uniform tension on the two wheel park brake cables 84, even when one cable 84 is longer than the other. The hook 90 is configured to drop into the aperture 97 during downward installation of the base 41 onto the vehicle floor pan. The hook 90 is configured to matingly closely engage the marginal material around the rear of the aperture 97 to prevent the spanning bracket 83 from working loose.

A docking bracket 101 (FIG. 9) is mounted on base 41. The docking bracket 101 includes a flat bottom 102 with apertures 103 for receiving spring clips (or nylon snap-in nuts for receiving screws) to securely attach the docking bracket 101 to the vehicle floor pan 103' under a rear section 104 of base 41. A tail section 105 extends rearwardly and an up flange 106 is formed at its rear edge. The up flange 106 includes apertures configured to matingly engage sheath connectors 108 on the wheel park brake cables 84. The sheath connector 108 secures an outer sleeve of the wheel park brake cables 84 in a fixed position, while an internal cable 110 is telescopeable within the sleeve 109. A pair of coil springs 111 bias the internal cables 110 of wheel park brake cables 84 to a normally tensioned position. A raised hump 112 is formed on the tail section 105 to stiffen the bracket 101. An aperture 113 is formed in front of the hump 112, and means such as the hook 114 on the front piece 94 can be provided to temporarily dock the spanning bracket 83 to the docking bracket 101 until the base assembly of 41–43 is fully positioned in the vehicle during installation.

In one contemplated method of installation, the docking bracket 101 is attached to a vehicle floor pan 103', and the wheel park brake cables 84 are secured to the rear piece 95, with the front piece 94 docked on the docking bracket 101 by engagement of the hook 114 on the front end of the hump 112. To install the assembly of the components 41–43, the base 41 is downwardly inserted into a vehicle and attached to a vehicle floor pan, with the hook 90 of cable connector sled 82 extending downwardly into the aperture 97 of the front piece 94 of the spanning bracket 83. During a first operation of the park brake handle 72, the docking hook 114 disengages and is released as the short cable 81 is tensioned, and the engagement hook 90 securely engages the flat section 96 of the front piece 94. Once tensioned, the cables 81 and 84 are horizontally aligned. The point of engagement of the hook 90 and aperture 97 is aligned with the cables 81 and 84, thus allowing the connector 82 to function properly without being twisted out of position by the tensioned cables 81 and 84.

Modified apparatus and components are shown in FIGS. 13–18, 19–21A, and 22–24. In these modified apparatus and components, similar or identical features are shown by identical numbers, but with the addition of the letters "A," "B," or "C." This is done to reduce redundant discussion.

The modified apparatus 40A (FIG. 14) includes a modified docking bracket 101A having an angled tail section 105A and an up flange 106A. The angled tail section 105A is angled rearwardly and downwardly at about a 20 to 30 degree angle. The up flange 106A extends perpendicularly upwardly and rearwardly from the angled tail section 105A. The docking bracket 101A further includes a notch 120 for engaging the docking hook 114A on spanning bracket 83A. The "camel back" ridge 120' stiffens the tail section 105A and a notch 120" provides an area for mateably slidably receiving the hook 90A.

The docking bracket 101A (FIG. 14) includes a vertical stud 121 that extends upwardly. A temporary docking station member 122 on the base 41A includes a flat bottom 123 that mateably engages the top of docking bracket 10A, and includes a hole 124 that engages the stud 121. A nut 125 is turned onto the stud 121 and secures the temporary docking station member 122 to the docking bracket 10A during assembly. The temporary docking station member 122 includes a pair of rear up flanges 126 having tabs 127 with inwardly extending protrusions 128 that extend toward each other.

The modified cable connection sled 82A (FIG. 14) is provided that is very similar to sled 82, but that is adapted to function on modified apparatus 40A. Sled 82A includes a pentagon-shaped rear section 129 having parallel side walls 130 and angled walls 131 that lead from the side walls 130 toward its hooked end 90A. The side walls 130 have an aperture or dimple 132 therein shaped to mateably releasably engage the protrusions 128, with a top of the side walls 130 engaging the tabs 127. As with sled 82, this arrangement holds the cable connection sled 82A temporarily during shipping and when installing the hook 90A of the cable connection sled 82A into the aperture 97A of the spanning bracket 83A. The tabs 127 provide positive support that helps prevent the sled 82A from being knocked out of position when the hook 90A of sled 82A is being inserted into the aperture 97A in spanning bracket 83A.

Spanning bracket 83A is modified to be a one-piece stamping that includes a temporary docking hook 114A for engaging slot 120, a pair of rear up flanges with keyholed apertures 100A for receiving cables 84A, and an aperture 97A for receiving the hook 90A on sled 82A.

The operation/use of the components (including the docking bracket 101A, the cable connection sled 82A, and the spanning bracket 83A, in combination with the park brake mechanism 42A), is similar to that described above in regard to the corresponding components. Specifically, the docking bracket 101A is attached to a vehicle floor pan 103A', and the wheel park brake cables 84A are secured to the spanning bracket 83A, with the spanning bracket 83A docked on the docking member 116 by engagement of the hook 114A on the notch 97A. To install the assembly of the components 41A–43A, the base 41A is downwardly inserted into a vehicle and attached to a vehicle floor pan 103A', with the hook 90A of cable connector sled 82A extending downwardly and rearwardly into engagement with the slot 97A of spanning bracket 83A. During a first operation of the park brake handle 72, the docking hook 114A is released as the short cable 81A is tensioned, and the spanning bracket 83A disengages from the docking member 116 and also securely engages the flat section 96A of the cable connector bracket 82A.

In a modified arrangement, a manual shifter 43B is provided for shifting a manual transmission (FIG. 19). The manual shift lever 45B is operably mounted on a modified base 41B. The modified base 41B includes a plurality of stanchions 140, such as the four shown. The stanchions 140 each have stiffening ribs 141 as required for a desired amount of rigidity, and an apertured boss 57B extends upwardly from a top thereof. The apertured bosses 57B are configured for screw attachment to a console not unlike console 44 (see FIG. 1) and/or to support a boot and cover 58B for covering a lower area around the bottom of the post 60B of the shift lever 45B. Horizontally facing holes 142 (FIG. 20) are formed in top sections of the stanchions 140. A plurality of bushings 143 (FIG. 19) for the holes 142 each include a sleeve section 144 and washer-like ends 145 at each end. Ribs 146 are formed longitudinally along the outer surface on the sleeve sections 144. The bushings 143 are made from a rubbery resilient material having a durometer chosen for optimal vibration dampening characteristics. The ribs 146 assist in the dampening characteristics of the bushings 143. The bushings 143 are shaped so that shift lever support 145 mounted therein does not directly contact the base 41B, thus providing optimal dampening of vibration traveling from the vehicle up through the base 41B to the shift lever 45B.

The shifter 43B includes a shift lever support 145 (FIG. 21) having front and rear sections 146' and 147, and a middle section 148. The front and rear sections 146' and 147 include transverse holes 149 shaped to closely receive an attachment stud 150 (FIG. 19). The studs 150 extend through the bushings 143 into the holes 149 to secure the support 145 in place, with the bushings 143 acting as dampeners to the support 145. A single stud 150 can extend completely through the support 145 at each end, or a pair of opposing studs 150 can be used at each end, depending on the functional requirements of the shifter 43B.

The support 145 (FIG. 21) includes enlarged apertures 151 and 152 formed in the front and rear sections 146' and 147 to save weight and to facilitate molding. The middle section 148 includes a socket section 153 shaped to mateably receive the ball section 155 on the lower part of shift lever 45B. A retainer 156 includes a midsection 157 shaped to hold the ball section 155 against the socket section 153. The retainer 156 includes one end 158 that hooks onto an edge of the middle section 148, and further includes another end 159 having a transverse hole 160 therein. The support 145 includes holes that align with the holes in the end 159, and a pivot pin 162 extends through the aligned holes to secure the retainer 156 on the support 145. A bell crank 163 is operably pivoted to the middle section 148 at location 163' and in fact can be pivoted to pin 162 if desired. A laterally extending arm 164 (FIG. 21A) extends from the ball section 155 of the shift lever 45B. The arm 164 includes an end operably engaging a rotate-and-slide universal joint 165 that slides within a short cylindrically-shaped hole 166 in one end 167 of the bell crank 163. A bottom/second end 168 of the bell crank 163 includes a universal connector 169 shaped for snap connection to a Bowden transmission shifter cable. The bottom of the shift lever 45B includes a universal connector-shaped section 172 (see FIG. 24) on its lower tip for connection to a second Bowden transmission shifter cable, as is known in the art, such that the shift lever 45B is adapted for a two-cable connection to control the manual transmission that it is connected to.

Apparatus 40C (FIGS. 22–24) includes a modified base 41C and manual shifter 43C that are similar to base 41B and shifter 43B. The use of identical identification numbers with different letters is believed to be sufficiently clear to a person of ordinary skill in the art, such that a separate detailed discussion of shifter 43C is not required. Nonetheless, it is noted that shifter 43C incorporates an integral mounting pivot pin 162C that both pivotally supports the bell crank 163C and also secures the retainer 156C in place, with the pin 162C being held in place by a washered screw 171. Hooked end 158C defines a recess that receives a rear edge of a top wall on the shift lever support 145C.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. An apparatus comprising:

a base configured for attachment to a vehicle and including a rear end with a mounting structure thereon;

a park brake mechanism operably mounted to the base;

a cable connector sled operably mounted on the mounting structure and connected to the park brake mechanism, the cable connector sled including flanges slidably engaging the mounting structure, and further including a hook; and a spanner bracket including an apertured flange and a trailing flange, the trailing flange being adapted to operably securely engage ends of a pair of park brake cables at spaced-apart locations, the spanner bracket being constructed to receive and engage the hook of the cable connector sled for quick drop-in assembly, and one of the spanner bracket and the cable connector sled being configured to pivotally adjust to uneven lengths of the pair of park brake cables, so that the spanner bracket provides an equal force to each of the park brake cables when pulled by the park brake mechanism, even when the park brake cables have unequal lengths.

2. The apparatus defined in claim 1 wherein the apertured flange includes an aperture pivotally engaging the hook, such that the hook pivots to compensate for misalignment and unequal length of the pair of cables, thus providing a uniform and balanced force to the pair of cables by operation of the park brake mechanism through the cable connector sled and the spanner bracket regardless of the different length and misalignment of cables.

3. The apparatus defined in claim 2 wherein the hook is elongated, and wherein the aperture includes a small end pivotally engaging a front end of the hook and a large end providing clearance for a rear end of the hook as the hook pivots within the aperture.

4. The apparatus defined in claim 2 wherein the mounting structure includes guide tabs and the cable connector sled includes flanges slidably engaging the guide tabs.

5. The apparatus defined in claim 1 wherein the spanner bracket is pivotally connected to the cable connector sled in a manner that allows the cable connector sled to pivotally adjust and compensate for unequal lengths in the pair of brake cables.

6. The apparatus defined in claim 1 wherein the mounting structure includes a docking station for temporarily supporting one of the cable connector sled and the spanning bracket during shipping.

7. The apparatus defined in claim 1 including a console attachment structure on the base and a console with connectors configured to snap-attachingly engage the console attachment structure for attachment to the base and configured to cover the base and the park brake mechanism.

* * * * *